(12) United States Patent
Sawada et al.

(10) Patent No.: US 12,289,070 B2
(45) Date of Patent: Apr. 29, 2025

(54) ELECTRIC MOTOR CONTROL DEVICE

(71) Applicant: Mitsubishi Electric Corporation, Tokyo (JP)

(72) Inventors: Akihiro Sawada, Tokyo (JP); Makoto Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 116 days.

(21) Appl. No.: 18/159,398

(22) Filed: Jan. 25, 2023

(65) Prior Publication Data

US 2023/0291344 A1 Sep. 14, 2023

(30) Foreign Application Priority Data

Mar. 8, 2022 (JP) ................................ 2022-035053

(51) Int. Cl.
*H02P 27/08* (2006.01)
*H02P 21/22* (2016.01)
*H02P 23/14* (2006.01)

(52) U.S. Cl.
CPC .............. *H02P 27/08* (2013.01); *H02P 21/22* (2016.02); *H02P 23/14* (2013.01)

(58) Field of Classification Search
CPC .......... H02P 27/08; H02P 21/22; H02P 23/14; H02P 6/28

USPC ............................... 318/400.02, 400.01, 700
See application file for complete search history.

(56) References Cited

U.S. PATENT DOCUMENTS

| 7,084,601 | B2 * | 8/2006 | Maeda | G01R 19/0092 |
| | | | | 318/803 |
| 9,698,717 | B2 * | 7/2017 | Yamaguchi | G01R 19/12 |
| 9,991,785 | B2 * | 6/2018 | Kashihara | H02M 1/32 |

FOREIGN PATENT DOCUMENTS

JP 6136897 B2 5/2017

* cited by examiner

*Primary Examiner* — David Luo
(74) *Attorney, Agent, or Firm* — Sughrue Mion, PLLC

(57) ABSTRACT

An electric motor control device includes a current detection unit, an interface unit, a switching unit, and an arithmetic processing unit. A detection signal of a current detected by the current detection unit is input to the interface unit. The interface unit includes a plurality of filters having time constants different from one another, and performs filtering processing on the detection signal. The switching unit controls power supplied to an electric motor. The arithmetic processing unit uses, as a selected filter, a filter selected from among the plurality of filters based on the length of a control pulse. The arithmetic processing unit uses, as a detected current value, a value obtained by A/D conversion of a processed signal that is the detection signal on which the filtering processing has been performed with the selected filter.

9 Claims, 12 Drawing Sheets

FIG.10

| DUTY RATIO D | RISE START TIME $t_s$ | THIRD SWITCH | FOURTH SWITCH | FIFTH SWITCH | SIXTH SWITCH | COMBINED RESISTANCE $R_s$ | COMBINED CAPACITANCE $C_s$ | FILTER TIME CONSTANT $\tau$ |
|---|---|---|---|---|---|---|---|---|
| $D \leq 25\%$ | $t_s \geq t_{s3}$ | ON | OFF | ON | ON | $R_1$ | $C_1+C_2$ | $\tau_3$ (LARGEST) |
| $25\% < D \leq 50\%$ | $t_{s2} \leq t_s < t_{s3}$ | ON | OFF | ON | OFF | $R_1$ | $C_1$ | $\tau_4$ |
| $50\% < D \leq 75\%$ | $t_{s1} \leq t_s < t_{s2}$ | OFF | ON | OFF | ON | $R_2$ | $C_2$ | $\tau_5$ |
| $D > 75\%$ | $t_s < t_{s1}$ | ON | ON | OFF | ON | $(R_1 R_2)/(R_1+R_2)$ | $C_2$ | $\tau_6$ (SMALLEST) |

ELECTRIC MOTOR CONTROL DEVICE

BACKGROUND OF THE INVENTION

1. Field of the Invention

This disclosure relates to an electric motor control device.

2. Description of the Related Art

In a load control device of the related art, timing of performing A/D conversion on a value of a current flowing in a switching element is set based on a delay amount of the switching element, a stable state start time, a fall start time, and a time required for the A/D conversion. The delay amount of the switching element is a time from a start point of a PWM cycle to a point in time at which the switching element is turned on. The stable state start time is a time from the start point of the PWM cycle to a point at which a PWM control pulse waveform reaches a stable state. The fall start time is a time from the start point of the PWM cycle to a point at which the PWM control pulse waveform starts to fall (for example, Japanese Patent No. 6136897.

With the load control device of the related art as described above, when a value of a load current changes during an on-period of the switching element, a detected current value obtained by the A/D conversion may deviate from a value to be originally obtained in some cases. A resultant problem is that power supplied to an electric motor cannot be controlled appropriately.

SUMMARY OF THE INVENTION

This disclosure has been made in order to solve the problem as described above, and an object of this disclosure is to provide an electric motor control device capable of appropriate control of power supplied to an electric motor even when a value of a load current changes during an on-period of a switching element.

According to at least one embodiment of this disclosure, there is provided an electric motor control device including: a switching unit including a switching element and configured to control power supplied to an electric motor; a current detection unit configured to output a detection signal corresponding to a current that flows in the electric motor; an interface unit configured to perform filtering processing on the detection signal; and an arithmetic processing unit configured to generate a control pulse for controlling the switching element. The interface unit includes a plurality of filters having time constants different from one another. The arithmetic processing unit is configured to use, as a selected filter, a filter selected from among the plurality of filters based on a length of the control pulse, and use, as a detected current value, a value obtained by A/D conversion of a processed signal that is the detection signal on which the filtering processing has been performed with the selected filter.

According to the electric motor control device of the at least one embodiment of this disclosure, the power supplied to the electric motor can be controlled appropriately even when the value of the load current changes during the on-period of the switching element.

BRIEF DESCRIPTION OF THE DRAWINGS

FIG. 10 is a table for showing an example of combinations of states into which a third switch to a sixth switch are brought by control exerted by the arithmetic processing unit of FIG. 9.

DESCRIPTION OF THE EMBODIMENTS

Now, embodiments of this disclosure are described with reference to the drawings.

First Embodiment

Figure 1:
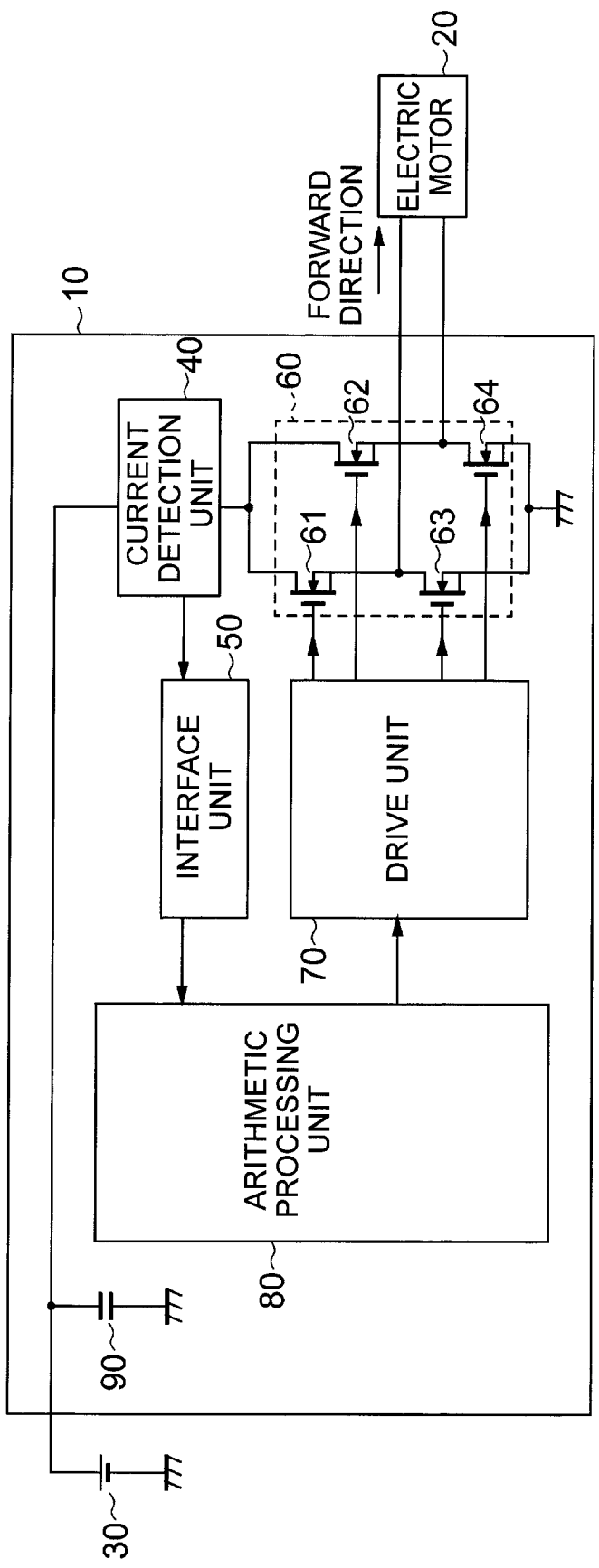
FIG. 1 is a block diagram for illustrating a configuration of an electric motor control device according to a first embodiment of this disclosure.

FIG. 1 is a block diagram for illustrating a configuration of an electric motor control device according to a first embodiment of this disclosure. An electric motor control device 10 includes a current detection unit 40, an interface unit 50, a switching unit 60, a drive unit 70, an arithmetic processing unit 80, and a smoothing capacitor 90.

An electric motor 20 and an external power source 30 are connected to the electric motor control device 10. The external power source 30 is a direct current power source. The electric motor 20 is a load of the electric motor control device 10. The electric motor control device 10 supplies alternating current power to the electric motor 20, to thereby drive the electric motor 20. The electric motor 20 is installed in, for example, an automobile. The electric motor 20 is used to drive an engine starter, a throttle actuator, an electric power steering device, and a radiator fan.

The current detection unit 40 includes a shunt resistor. The current detection unit 40 is connected between a positive terminal of the external power source 30 and the switching unit 60. The current detection unit 40 converts a current into a voltage value by a voltage drop occurring in the shunt resistor, and outputs a detection signal corresponding to the current flowing in the electric motor 20.

The detection signal of the current detected by the current detection unit 40 is input to the interface unit 50. The interface unit 50 performs filtering processing on the detection signal. The interface unit 50 includes a plurality of filters having time constants different from one another.

The switching unit 60 includes a first switching element 61, a second switching element 62, a third switching element 63, and a fourth switching element 64. Insulated gate bipolar transistors (IGBT), for example, are used for the first switching element 61, the second switching element 62, the third switching element 63, and the fourth switching element 64.

The first switching element 61 and the third switching element 63 are connected in series to each other. The second switching element 62 and the fourth switching element 64 are connected in series to each other.

A first group of switching elements which is formed from the first switching element 61 and the third switching element 63 and a second group of switching elements which is formed from the second switching element 62 and the fourth switching element 64 are connected in parallel. The switching unit 60 is connected to the electric motor 20 at a point between the first switching element 61 and the third switching element 63, and at a point between the second switching element 62 and the fourth switching element 64.

The switching unit 60 uses the first switching element 61, the second switching element 62, the third switching element 63, and the fourth switching element 64 to control power supplied to the electric motor 20.

The drive unit 70 converts a control pulse generated in the arithmetic processing unit 80 into a drive signal, and outputs the drive signal generated by the conversion to the switching unit 60. The drive signal is applied to each switching element of the switching unit 60 as a gate voltage.

The arithmetic processing unit 80 generates the control pulse for controlling switching operation of the first switching element 61, the second switching element 62, the third switching element 63, and the fourth switching element 64. The arithmetic processing unit 80 uses, as a selected filter, a filter selected from among the plurality of filters of the interface unit 50 based on the length of the control pulse. The arithmetic processing unit 80 performs A/D conversion on a processed signal, which is the detection signal on which filtering processing has been performed with use of the selected filter. The arithmetic processing unit 80 uses, as a detected current value, a value obtained by performing the A/D conversion on the processed signal. The arithmetic processing unit 80 also uses the detected current value to correct a voltage command value of a voltage command directed to the electric motor 20.

The smoothing capacitor 90 is provided between a point that is between the current detection unit 40 and the positive terminal of the external power source 30, and a ground GND. The smoothing capacitor 90 smooths a voltage applied to the current detection unit 40.

Figure 2:
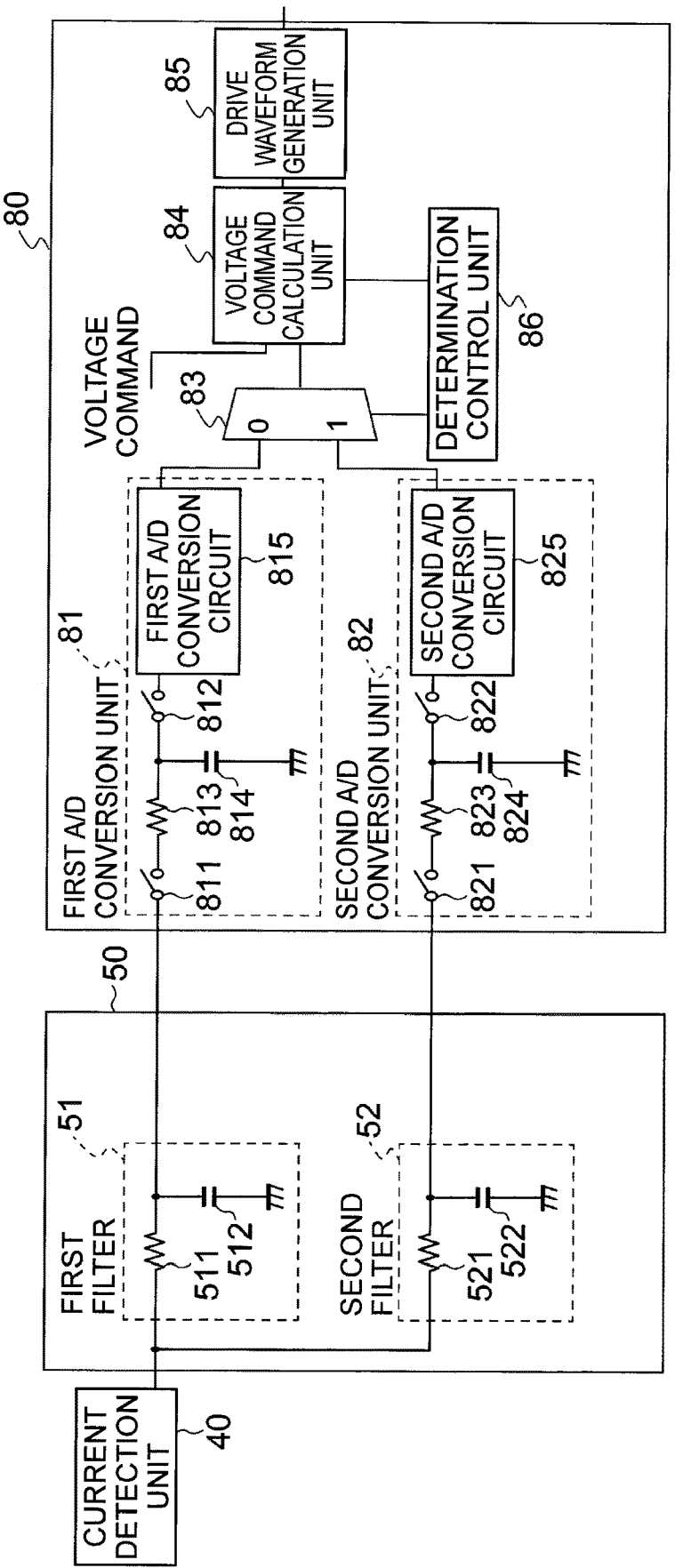
FIG. 2 is a diagram for illustrating configurations of an interface unit and an arithmetic processing unit of FIG. 1.

FIG. 2 is a diagram for illustrating configurations of the interface unit 50 and the arithmetic processing unit 80 of FIG. 1. The interface unit 50 includes, as the plurality of filters, a first filter 51 and a second filter 52. An output signal from the current detection unit 40 is input to each of the first filter 51 and the second filter 52. The first filter 51 and the second filter 52 are low-pass filters. The first filter 51 and the second filter 52 decrease surge components that are noise mainly including high-frequency components.

The first filter 51 includes a first resistor 511 and a first capacitor 512. The output signal input to the first filter 51 is output to the arithmetic processing unit 80 through the first resistor 511. The first capacitor 512 is connected between an output side of the first resistor 511 and the ground GND.

When a resistance value of the first resistor 511 and a capacitance value of the first capacitor 512 are given as $R_1$ and $C_1$, respectively, a first time constant $\tau_1$, which is a time constant of the first filter 51, is expressed by $C_1 \times R_1$. The first filter 51 decreases high frequency components higher than a cutoff frequency "$f_{c1}=1/(2\pi \times \tau_1)$" of the detection signal.

The second filter 52 includes a second resistor 521 and a second capacitor 522. The output signal input to the second filter 52 is output to the arithmetic processing unit 80 through the second resistor 521. The second capacitor 522 is connected between an output side of the second resistor 521 and the ground GND.

When a resistance value of the second resistor 521 and a capacitance value of the second capacitor 522 are given as $R_2$ and $C_2$, respectively, a second time constant $\tau_2$, which is a time constant of the second filter 52, is expressed by $C_2 \times R_2$. The second filter 52 decreases high frequency components higher than a cutoff frequency "$f_{c2}=1/(2\pi \times \tau_2)$" of the detection signal. A value of the second time constant $\tau_2$ is set in advance to a value smaller than a value of the first time constant $\tau_1$.

The arithmetic processing unit 80 includes, as a plurality of A/D conversion units, a first A/D conversion unit 81 and a second A/D conversion unit 82. The arithmetic processing unit 80 further includes a selector 83, a voltage command calculation unit 84, a drive waveform generation unit 85, and a determination control unit 86.

The first A/D conversion unit 81 includes a first input switch 811, a first output switch 812, a first internal resistor 813, a first internal capacitor 814, and a first A/D conversion circuit 815. One end of the first input switch 811 is connected to an output side of the first filter 51. The other end of the first input switch 811 is connected to one end of the first output switch 812 via the first internal resistor 813.

The other end of the first output switch 812 is connected to an input side of the first A/D conversion circuit 815. The first internal capacitor 814 is connected between a point that is between the first internal resistor 813 and the first output switch 812, and the ground GND. Accordingly, a first processed signal, which is a processed signal obtained through processing by the first filter 51, is input to the first A/D conversion unit 81.

The second A/D conversion unit 82 includes a second input switch 821, a second output switch 822, a second internal resistor 823, a second internal capacitor 824, and a second A/D conversion circuit 825. One end of the second input switch 821 is connected to an output side of the second filter 52. The other end of the second input switch 821 is connected to one end of the second output switch 822 via the second internal resistor 823.

The other end of the second output switch 822 is connected to an input side of the second A/D conversion circuit 825. The second internal capacitor 824 is connected between a point that is between the second internal resistor 823 and the second output switch 822, and the ground GND. Accordingly, a second processed signal, which is a processed signal obtained through processing by the second filter 52, is input to the second A/D conversion unit 82.

In this manner, the first filter 51 and the first A/D conversion unit 81 correspond to each other on a one-to-one basis, and the second filter 52 and the second A/D conversion unit 82 correspond to each other on a one-to-one basis.

The selector 83 is a 2:1 selector. An output signal from the first A/D conversion unit 81, an output signal from the second A/D conversion unit 82, and a selector control signal from the determination control unit 86 are input to the selector 83. The selector 83 selects and outputs the output signal from the first A/D conversion unit 81 when logic of the selector control signal is "0". The selector 83 selects and outputs the output signal from the second A/D conversion unit 82 when the logic of the selector control signal is "1".

The voltage command calculation unit 84 sets, as a control command, a current command directed to the electric motor 20, and determines an amplitude of a voltage command based on the set current command. More specifically, the voltage command calculation unit 84 calculates a voltage command by proportional-integral control so that a deviation between the current command directed to the electric motor 20 and the detected current value is zero. The voltage command calculation unit 84 then determines the amplitude of the voltage command, that is, an applied voltage to be input to the drive waveform generation unit 85, based on the calculated voltage command.

The drive waveform generation unit 85 compares the applied voltage and a reference triangular wave as a carrier signal, to thereby calculate a pulse width modulation (PWM) control pulse. The drive waveform generation unit 85 outputs the calculated PWM control pulse to the drive unit 70.

The determination control unit 86 generates, at timing set in advance, signals for separately controlling the first input switch 811, the first output switch 812, the second input switch 821, and the second output switch 822. The determination control unit 86 outputs each of the generated signals to a corresponding switch out of the first input switch 811, the first output switch 812, the second input switch 821, and the second output switch 822.

More specifically, the determination control unit 86 controls the first input switch 811, the first output switch 812, the second input switch 821, and the second output switch 822 so that a first sampling period and a second sampling period coincide with each other. The first sampling period is a period of sampling in the first A/D conversion circuit 815. The second sampling period is a period of sampling in the second A/D conversion circuit 825.

At a start point of the first sampling period, the determination control unit 86 switches the first input switch 811 from off to on, and also switches the first output switch 812 from on to off. This starts charging of the first internal capacitor 814. At an end point of the first sampling period, the determination control unit 86 switches the first input switch 811 from on to off, and also switches the first output switch 812 from off to on. This causes a voltage generated by the charging of the first internal capacitor 814 during the first sampling period to be applied to the first A/D conversion circuit 815.

At a start point of the second sampling period, the determination control unit 86 switches the second input switch 821 from off to on, and also switches the second output switch 822 from on to off. This starts charging of the second internal capacitor 824. At an end point of the second sampling period, the determination control unit 86 switches the second input switch 821 from on to off, and also switches the second output switch 822 from off to on. This causes a voltage generated by the charging of the second internal capacitor 824 during the second sampling period to be applied to the second A/D conversion circuit 825.

The first A/D conversion circuit 815 converts the applied voltage into a digital value. Similarly, the second A/D conversion circuit 825 converts the applied voltage into a digital value. A bit count of A/D conversion in the first A/D conversion circuit 815 and a bit count of A/D conversion in the second A/D conversion circuit 825 are the same. The A/D conversion takes a time based on the bit count of the A/D conversion.

The determination control unit 86 also generates the selector control signal for controlling the selector 83, based on the PWM control pulse generated by the drive waveform generation unit 85, and outputs the selector control signal to the selector 83. The determination control unit 86 sets the logic of the selector control signal to "0" when a duty ratio D of the PWM control pulse is 50% or lower. When the duty ratio D of the PWM control pulse is higher than 50%, on the other hand, the determination control unit 86 sets the logic of the selector control signal to "1". The duty ratio D is a ratio in length of the PWM control pulse to one cycle of the reference triangular wave.

Figure 3:
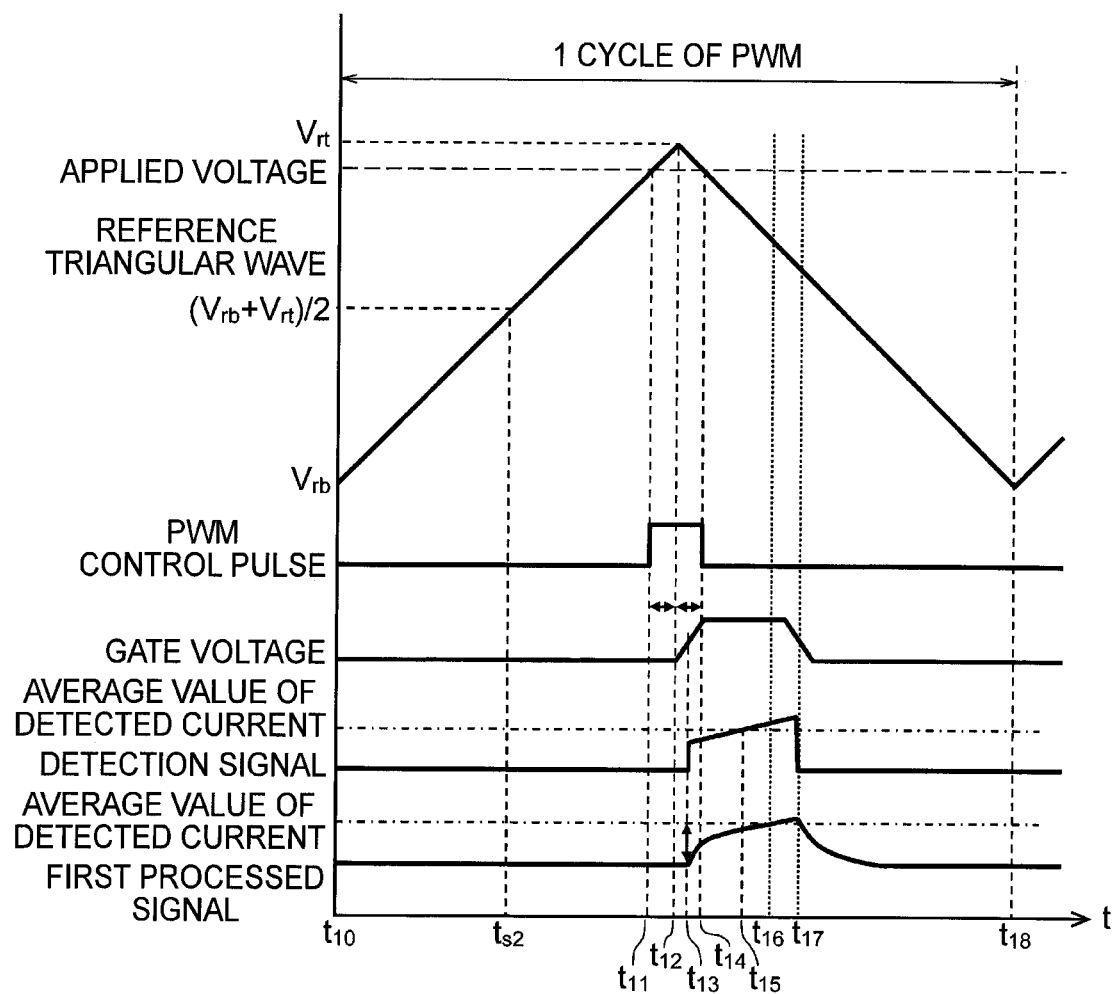
FIG. 3 is a time chart for illustrating operation of the electric motor control device of FIG. 1 in a case in which a duty ratio of a PWM control pulse is 50% or lower.

FIG. 3 is a time chart for illustrating operation of the electric motor control device 10 of FIG. 1 in a case in which the duty ratio D of the PWM control pulse is 50% or lower.

In FIG. 3, the reference triangular wave and the applied voltage, the PWM control pulse, the gate voltage, the detection signal, and the first processed signal are illustrated in the stated order from top downward. The detection signal is a signal of a detected current input from the current detection unit 40 to the interface unit 50.

In FIG. 3, one cycle of the reference triangular wave is illustrated. The one cycle of the reference triangular wave in FIG. 3 is a period from a time $t_{10}$ to a time $t_{18}$. The reference triangular wave is lowest at the time $t_{10}$ and the time $t_{18}$ and is highest at a time $t_{12}$. A smallest value of the reference triangular wave is $V_{rb}$ and a largest value of the reference triangular wave is $V_{rt}$.

The reference triangular wave exceeds the applied voltage at a time $t_{11}$, and drops lower than the applied voltage at a time $t_{14}$. The drive waveform generation unit 85 compares the applied voltage to the reference triangular wave to obtain the PWM control pulse. The obtained PWM control pulse is a rectangular wave that rises at the time $t_{11}$ and falls at the time $t_{14}$.

A time $t_{s2}$ is a time at which an increasing voltage of the reference triangular wave reaches an average value "$(V_{rb}+V_{rt})/2$" of the reference triangular wave. When it is assumed that the PWM control pulse rises at the time $t_{s2}$, the duty ratio D of the PWM control pulse is 50%. As illustrated in FIG. 3, when the duty ratio D of the PWM control pulse is 50% or lower, a rise start time $t_s$ of the PWM control pulse is the time $t_{11}$. That is, the rise start time $t_s$ of the PWM control pulse is the time $t_{s2}$ or later.

The PWM control pulse output from the drive waveform generation unit 85 is applied to the drive unit 70 as the gate voltage. A rise start time of the gate voltage is the time $t_{12}$. The rise start time of the gate voltage is thus delayed due to propagation delays in the drive unit 70 and the switching unit 60, with respect to the rise start time $t_s(=t_{11})$ of the PWM control pulse. A length of time from the time $t_{12}$ to the time $t_{14}$ which is required for the gate voltage to rise is longer than a time required for the PWM control pulse to rise, because a capacity of a gate of each switching element to be controlled out of the four switching elements 61 to 64 is required to be charged.

The PWM control pulse causes the first switching element 61 to enter an ON state at a time $t_{13}$, and to enter an OFF state at a time $t_{17}$. A current accordingly flows in a forward direction in the electric motor 20 between the time $t_{13}$ and the time $t_{17}$. For duration of the current flow in the electric motor 20, the current is detected by the current detection unit 40. A value of the detection signal keeps increasing for the duration of the current flow in the electric motor 20 due to an inductance component of the electric motor 20.

In the switching unit 60, the state of each of the switching elements 61 to 64 is determined based on a direction in which the electric motor 20 is rotated. For example, when the electric motor 20 is rotated in a forward direction, the arithmetic processing unit 80 performs PWM control on the first switching element 61 to control the second switching element 62, the third switching element 63, and the fourth switching element 64 so that the second switching element 62 and the third switching element 63 are always in an OFF state, and so that the fourth switching element 64 is always in an ON state.

In this case, a current flows in the current detection unit 40 for duration of an ON state of the first switching element 61. However, a return current flows in the electric motor 20 through a parasitic diode of the third switching element 63 and through the fourth switching element 64 even when the first switching element 61 is in an OFF state.

The value of the detection signal matches an average value of the detected current at a time $t_{15}$. The time $t_{15}$ is a time between the time $t_{13}$ and the time $t_{17}$.

The first processed signal has been blunted by the first filter 51. A time $t_{16}$ at which a value of the first processed signal reaches the average value of the detected current is delayed with respect to the time $t_{15}$ at which the value of the detection signal reaches the average value of the detected current.

Figure 4:
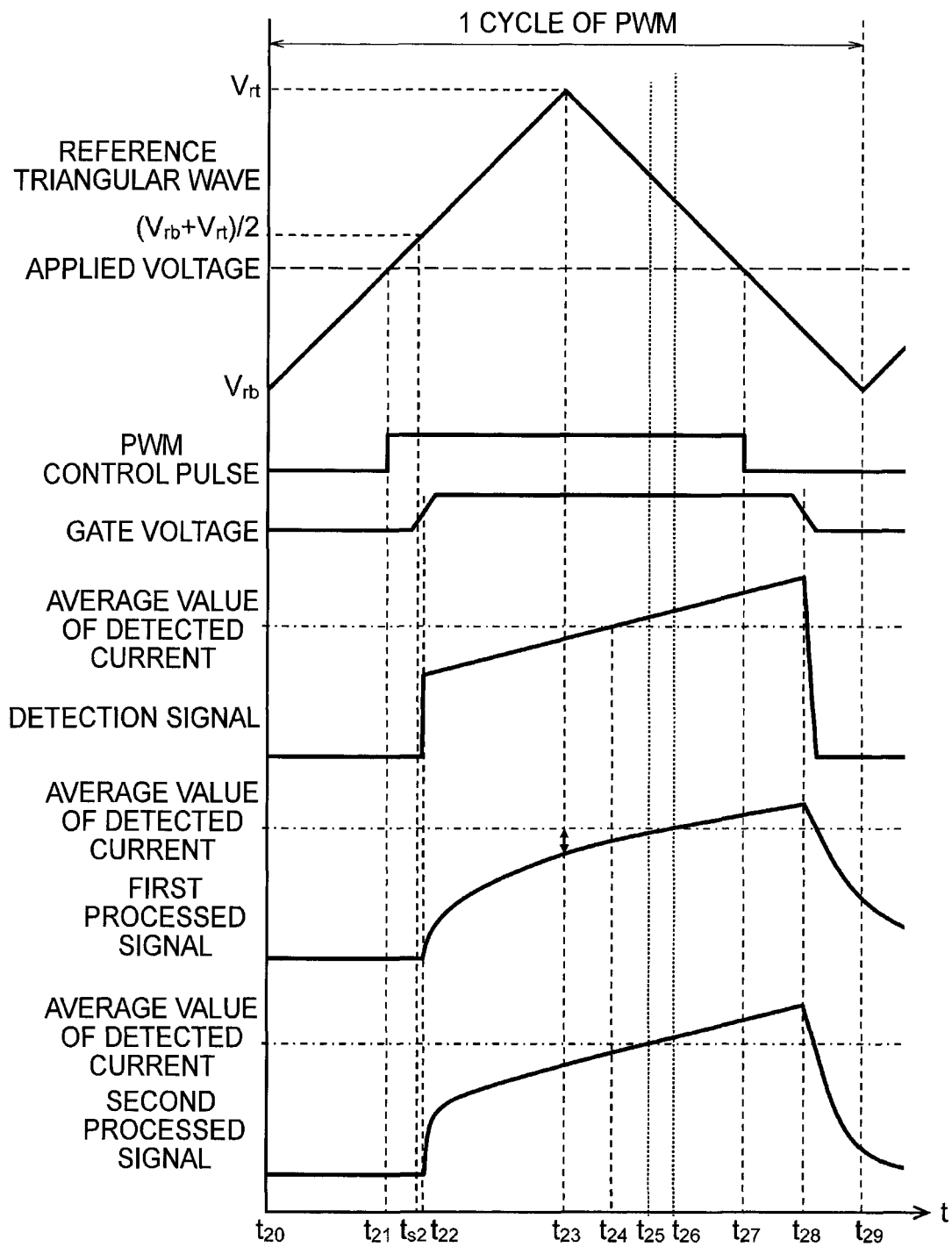
FIG. 4 is a time chart for illustrating the operation of the electric motor control device of FIG. 1 in a case in which the duty ratio of a PWM control pulse is higher than 50%.

FIG. 4 is a time chart for illustrating the operation of the electric motor control device 10 of FIG. 1 in a case in which the duty ratio D of the PWM control pulse is higher than 50%.

In FIG. 4, the reference triangular wave and the applied voltage, the PWM control pulse, the gate voltage, the detection signal, the first processed signal, and the second processed signal are illustrated in the stated order from top downward.

In FIG. 4, one cycle of the reference triangular wave is illustrated as in FIG. 3. The one cycle of the reference triangular wave in FIG. 4 is a period from a time $t_{20}$ to a time $t_{29}$. The reference triangular wave takes a lowest value $V_{rb}$ at the time $t_{20}$ and the time $t_{29}$ and takes a highest value $V_{rt}$ at a time $t_{23}$. The reference triangular wave exceeds the applied voltage at a time $t_{21}$, and drops lower than the applied voltage at a time $t_{27}$. The obtained PWM control pulse is a rectangular wave that rises at the time $t_{21}$ and falls at the time $t_{27}$.

As illustrated in FIG. 4, when the duty ratio D of the PWM control pulse is higher than 50%, the time $t_{21}$ which is the rise start time $t_s$ of the PWM control pulse is earlier than the time $t_{s2}$.

As in the example illustrated in FIG. 3, the rise start time of the gate voltage is delayed with respect to the time $t_{21}$ which is the rise start time $t_s$ of the PWM control pulse, and a time required for the gate voltage to rise is longer than a time required for the PWM control pulse to rise.

The PWM control pulse causes the first switching element 61 to enter the ON state at a time $t_{22}$, and to enter the OFF state at a time $t_{28}$. A current accordingly flows in the forward direction in the electric motor 20 between the time $t_{22}$ and the time $t_{28}$.

The value of the detection signal matches an average value of the detected current at a time $t_{24}$. The time $t_{24}$ is a time between the time $t_{22}$ and the time $t_{28}$.

The first processed signal has been blunted by the first filter 51. A time $t_{26}$ at which the value of the first processed signal reaches the average value of the detected current is delayed with respect to the time $t_{24}$ at which the value of the detection signal reaches the average value of the detected current. The time $t_{26}$ is later than the time $t_{16}$, which is a sampling time in FIG. 3.

Timing of A/D conversion is once per cycle of the reference triangular wave. For example, a case of performing A/D conversion at the time $t_{13}$ during a period in which the PWM control pulse is generated is considered. In this case, a difference between the first processed signal at the time $t_{13}$ and the average value of the detected current is larger than a difference between the first processed signal at the time $t_{23}$ of FIG. 4 which corresponds to the time $t_{13}$ and the average value of the detected current. The mismatch between the two differences is caused by the propagation delay of the PWM control pulse, the delay of the rise time of the gate voltage, and waveform blunting by the interface unit 50.

However, irrespective of whether the duty ratio D is equal to or lower than 50% or higher than 50%, the average value of the detected current cannot correctly be obtained as long as A/D conversion is executed at the time $t_{13}$.

When the duty ratio D is 50% or lower, as illustrated in FIG. 3, the average value of the detected current is correctly obtained by executing A/D conversion of the first processed signal by the first A/D conversion unit 81 at the time $t_{16}$.

When the duty ratio D is higher than 50%, on the other hand, a value obtained by executing A/D conversion of the first processed signal by the first A/D conversion unit 81 at, for example, the time $t_{25}$ is smaller than the average value of the detected current as illustrated in FIG. 4. The time $t_{25}$ of FIG. 4 is the same time as the time $t_{16}$ of FIG. 3 in one cycle of the reference triangular wave.

The second processed signal is blunted by the second filter 52. However, the second time constant $\tau_2$ is set to a value smaller than the first time constant $\tau_1$, and a delay time until a value of the second processed signal reaches the average value of the detected current is accordingly shorter than a delay time until the value of the first processed signal reaches the average value of the detected current. Further, in FIG. 4, the second time constant $\tau_2$ is set in advance so that the value of the second processed signal reaches the average value of the detected current at the time $t_{25}$.

Accordingly, when the duty ratio D is higher than 50%, the average value of the detected current is correctly obtained by executing A/D conversion of the second processed signal by the second A/D conversion unit 82 at the time $t_{25}$.

Thus, the determination control unit 86 sets the logic of the selector control signal to "0" when the duty ratio D is 50% or lower, that is, when the rise start time $t_s$ of the PWM control pulse is the time $t_{s2}$ or later, to thereby cause the selector 83 to select the output from the first A/D conversion unit 81. On the other hand, when the duty ratio D is higher than 50%, that is, when the rise start time $t_s$ of the PWM control pulse precedes the time $t_{s2}$, the determination control unit 86 sets the logic of the selector control signal to "1", to thereby cause the selector 83 to select the output from the second A/D conversion unit 82.

Figure 5:
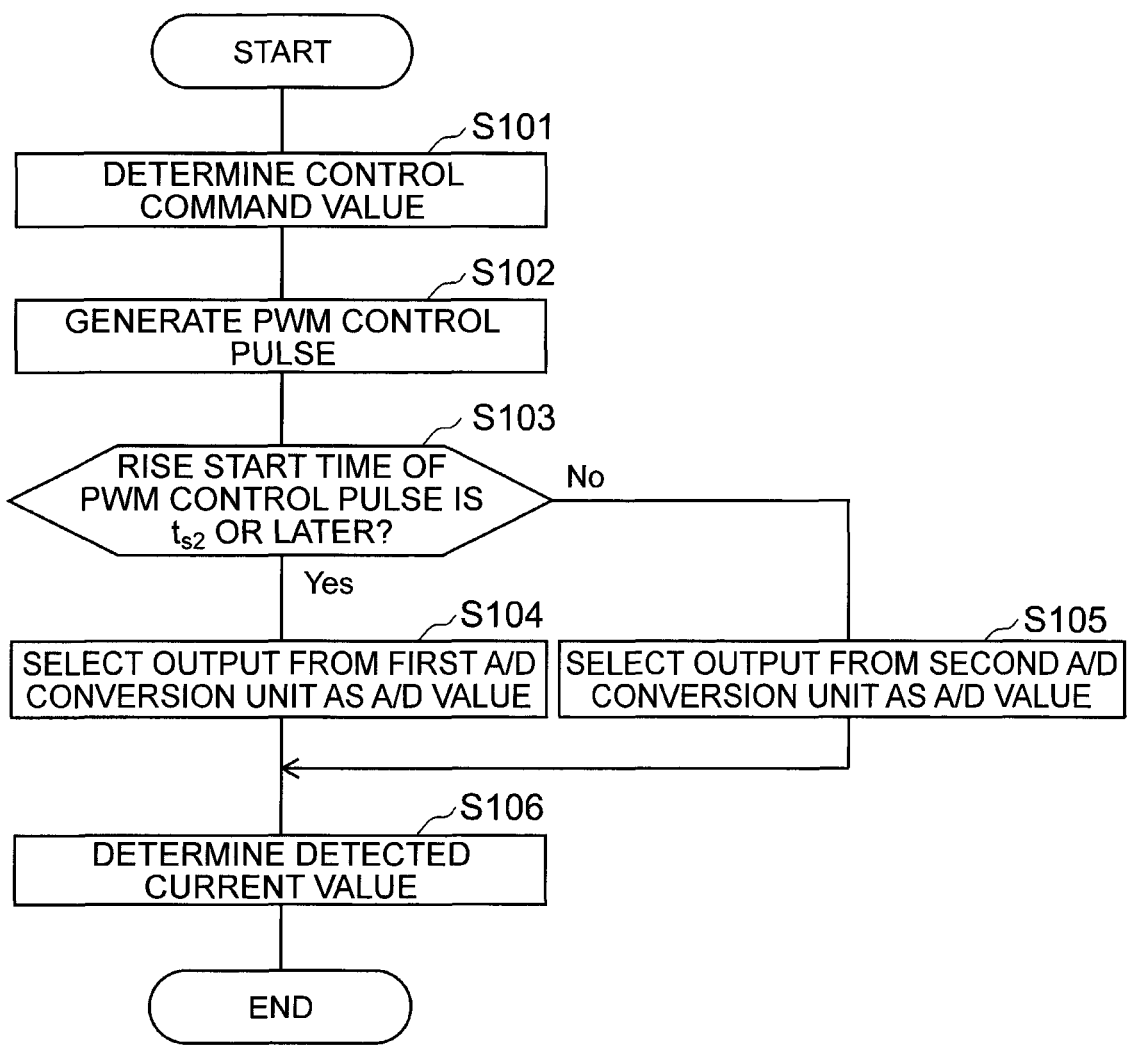
FIG. 5 is a flow chart for illustrating an electric motor control routine executed by the arithmetic processing unit of FIG. 1.

FIG. 5 is a flow chart for illustrating an electric motor control routine executed by the arithmetic processing unit 80 of FIG. 1. The routine of FIG. 5 is designed so as to be executed, for example, each time a control command arrives. When the routine of FIG. 5 is started, the arithmetic processing unit 80 determines, in Step S101, a control command value of a control command directed to the electric motor 20.

To give a more specific description, the voltage command value of the voltage command directed to the electric motor 20 and a detected current value determined in the last execution of the electric motor control routine are input to the voltage command calculation unit 84. The voltage command calculation unit 84 determines an applied voltage to be input to the drive waveform generation unit 85, based on the voltage command value and the detected current value determined in the last execution of the electric motor control routine.

Next, in Step S102, the drive waveform generation unit 85 generates the PWM control pulse by comparing the determined applied voltage to the reference triangular wave.

Next, in Step S103, the determination control unit 86 determines whether the rise start time $t_s$ of the generated PWM control pulse is the time $t_{s2}$ or later.

When the rise start time $t_s$ of the PWM control pulse is the time $t_{s2}$ or later, the determination control unit 86 causes, in Step S104, the selector 83 to select the output from the first A/D conversion unit 81. That is, the determination control unit 86 sets the logic of the selector control signal to "0".

When the rise start time $t_s$ of the PWM control pulse precedes the time $t_{s2}$, on the other hand, the determination control unit 86 causes, in Step S105, the selector 83 to select the output from the second A/D conversion unit 82. That is, the determination control unit 86 sets the logic of the selector control signal to "1".

Next, in Step S106, the determination control unit 86 determines the selected A/D value as the detected current value, and ends this routine for now. The detected current value determined in Step S106 is used in the next execution of the routine.

As described above, the electric motor control device 10 includes the switching unit 60, the current detection unit 40, the interface unit 50, and the arithmetic processing unit 80. The switching unit 60 includes the first switching element 61, the second switching element 62, the third switching element 63, and the fourth switching element 64, and controls power supplied to the electric motor 20.

The current detection unit 40 outputs a detection signal corresponding to a current flowing in the electric motor 20. The interface unit 50 performs filtering processing on the detection signal. The arithmetic processing unit 80 generates a control pulse for controlling the first switching element 61, the second switching element 62, the third switching element 63, and the fourth switching element 64.

The interface unit 50 includes the first filter 51 and the second filter 52 which have time constants different from each other. The arithmetic processing unit 80 selects, as a selected filter, a filter selected from the first filter 51 and the second filter 52 based on the length of the control pulse, and uses, as the detected current value, a value obtained by executing A/D conversion on a processed signal that is the detection signal on which filtering processing has been performed with the selected filter.

In this manner, according to the electric motor control device 10 of the first embodiment, a detected current value that is obtained is prevented from deviating from a value to be originally obtained, by changing the selected filter based on the length of the control pulse for controlling the switching elements. Accordingly, power supplied to the electric motor can be controlled appropriately even when a value of a load current changes during the ON period of the switching elements.

In addition, according to the electric motor control device 10 of the first embodiment, a memory for storing control timing and a circuit for executing control at the stored control timing are unrequired because the selected filter is changed based on the length of the control pulse for controlling the switching elements.

The detected current value is an average value of current values detected in a period for which the control pulse keeps the switching elements in an ON state.

According to this configuration, a detected current value that is obtained is prevented from deviating from the average value of current values detected during a period for which the control pulse keeps the switching elements in an ON state, by changing the selected filter based on the length of the control pulse for controlling the switching elements. Accordingly, power supplied to the electric motor can be controlled more appropriately even when the value of the load current changes during the ON period of the switching elements.

The arithmetic processing unit 80 includes, as a plurality of A/D conversion units, the first A/D conversion unit 81 and the second A/D conversion unit 82. The first filter 51 and the first A/D conversion unit 81 correspond to each other on a one-to-one basis, and the second filter 52 and the second A/D conversion unit 82 correspond to each other on a one-to-one basis.

According to this configuration, it suffices to determine which filter is to be selected before A/D conversion is completed. Consequently, compared to a device that is required to determine which filter is to be selected before A/D conversion is started, there is extra time between acquisition of the detection signal and determination of which filter is to be selected. The electric motor control device 10 is thus adaptable to even faster electric motor control.

Second Embodiment

Figure 6:
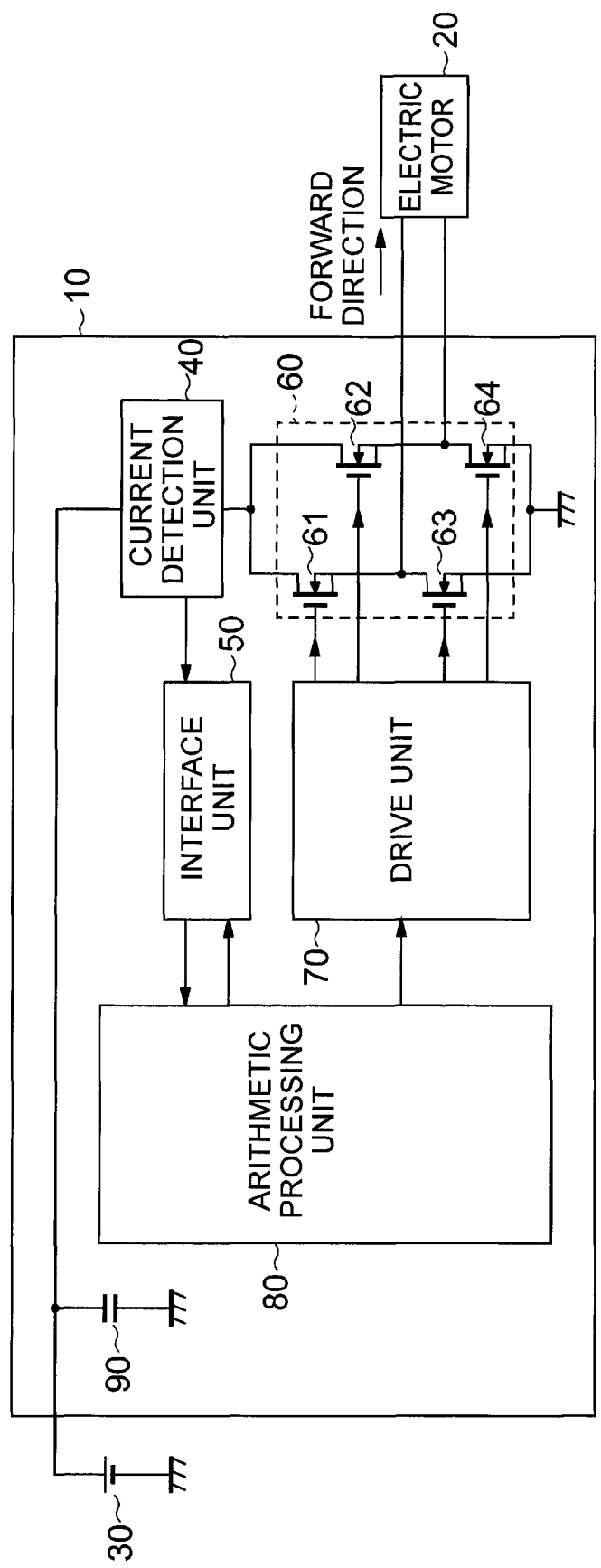
FIG. 6 is a block diagram for illustrating a configuration of an electric motor control device according to a second embodiment of this disclosure.

An electric motor control device according to a second embodiment of this disclosure is described next. FIG. 6 is a block diagram for illustrating a configuration of the electric motor control device according to the second embodiment. Compared to the electric motor control device 10 of FIG. 1, an additional control signal is output from the arithmetic processing unit 80 to the interface unit 50 in the electric motor control device 10 of FIG. 6.

Other than the point described above, the electric motor control device 10 of FIG. 6 has the same configuration as the configuration of the electric motor control device 10 of FIG. 1. Description on the same components as those of the electric motor control device 10 of FIG. 1 is omitted below.

Figure 7:
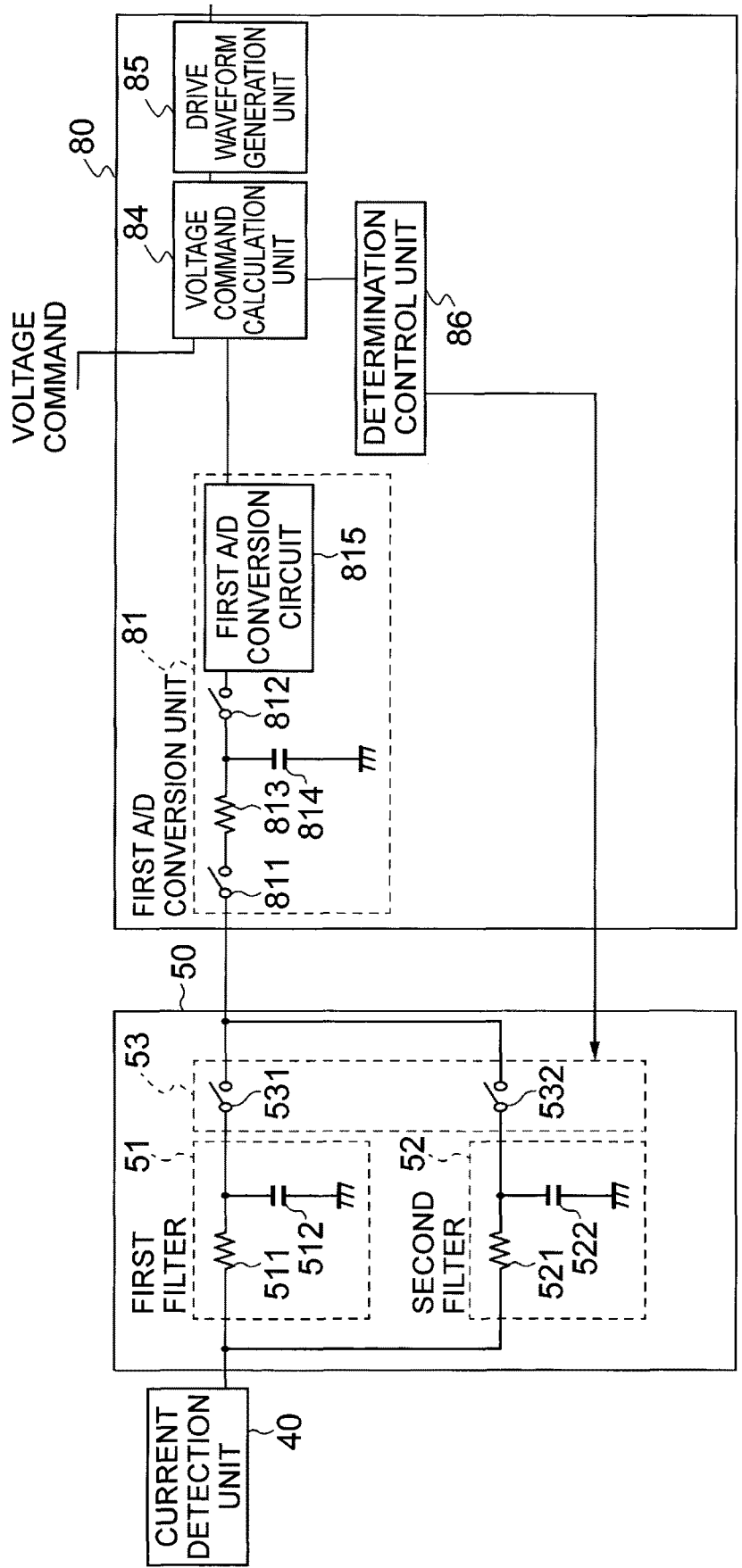
FIG. 7 is a diagram for illustrating configurations of an interface unit and an arithmetic processing unit of FIG. 6.

FIG. 7 is a diagram for illustrating configurations of the interface unit 50 and the arithmetic processing unit 80 of FIG. 6. The interface unit 50 includes the first filter 51 and the second filter 52, and also includes a first switch unit 53 located with the first filter 51 and the second filter 52 on one side and the arithmetic processing unit 80 on the other side. The arithmetic processing unit 80 includes the first A/D conversion unit 81, the voltage command calculation unit 84, the drive waveform generation unit 85, and the determination control unit 86.

The first filter 51 has the same configuration as the configuration of the first filter 51 of FIG. 2. The second filter 52 has the same configuration as the configuration of the second filter 52 of FIG. 2. Description of those is accordingly omitted.

The first switch unit 53 includes a first switch 531 and a second switch 532. One end of the first filter 51 is connected to the current detection unit 40. The other end of the first filter 51 is connected to the first A/D conversion unit 81 via the first switch 531. One end of the second filter 52 is connected to the current detection unit 40. The other end of the second filter 52 is connected to the first A/D conversion unit 81 via the second switch 532.

The first A/D conversion unit 81 has the same configuration as the configuration of the first A/D conversion unit 81 of FIG. 2. The arithmetic processing unit 80 in the second embodiment does not include the second A/D conversion unit 82, and consequently is incapable of concurrent execution of A/D conversion on two signals.

The first switch 531 and the second switch 532 are separately turned on and off by the determination control unit 86. For example, the determination control unit 86 turns the first switch 531 on and the second switch 532 off, to thereby select the first filter 51 as the selected filter. The determination control unit 86 turns the first switch 531 off and the second switch 532 on, to thereby select the second filter 52 as the selected filter.

That is, the determination control unit 86 selects, as the selected filter, one filter out of the first filter 51 and the second filter 52 with use of the first switch 531 and the second switch 532, based on the length of a PWM control pulse.

Figure 8:
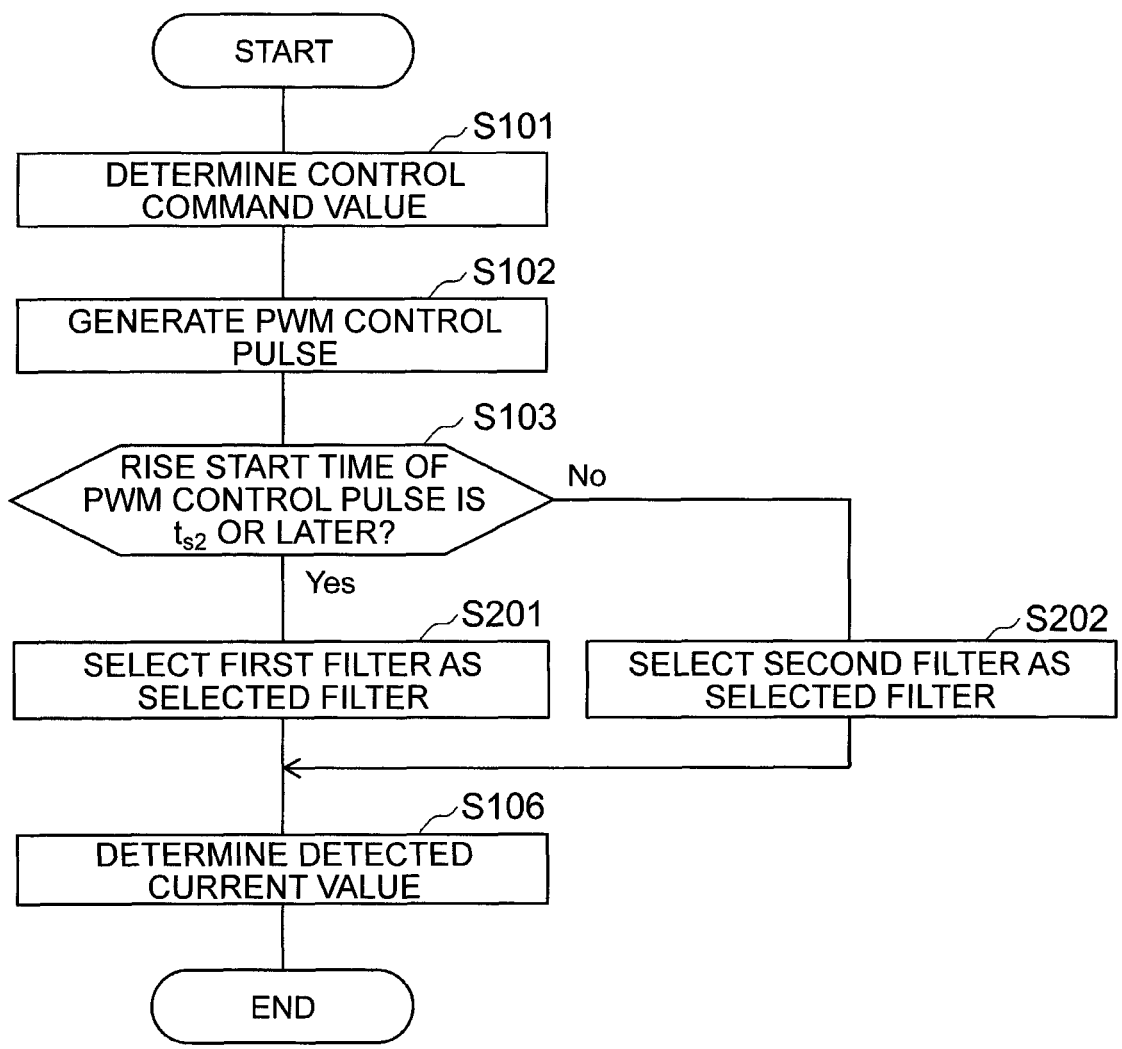
FIG. 8 is a flow chart for illustrating an electric motor control routine executed by the arithmetic processing unit of FIG. 7.

FIG. 8 is a flow chart for illustrating an electric motor control routine executed by the arithmetic processing unit 80 of FIG. 6. The routine of FIG. 8 is designed so as to be executed, for example, each time a control command arrives. When the routine of FIG. 8 is started, the arithmetic processing unit 80 determines, in Step S101, a control command value of a control command directed to the electric motor 20.

To give a more specific description, the voltage command value of the voltage command directed to the electric motor 20 and a detected current value determined in the last execution of the electric motor control routine are input to the voltage command calculation unit 84. The voltage command calculation unit 84 determines an applied voltage to be input to the drive waveform generation unit 85, based on the voltage command value and the detected current value determined in the last execution of the electric motor control routine.

Next, in Step S102, the drive waveform generation unit 85 generates the PWM control pulse by comparing the determined applied voltage to the reference triangular wave.

Next, in Step S103, the determination control unit 86 determines whether the rise start time $t_s$ of the generated PWM control pulse is the time $t_{s2}$ or later.

When the rise start time $t_s$ of the PWM control pulse is the time $t_{s2}$ or later, the determination control unit 86 selects, in Step S201, the first filter 51 as the selected filter.

When the rise start time $t_s$ of the PWM control pulse precedes the time $t_{s2}$, on the other hand, the determination control unit 86 selects, in Step S202, the second filter 52 as the selected filter.

Next, in Step S106, the determination control unit 86 determines the obtained A/D value as the detected current value, and ends this routine for now. The detected current value determined in Step S106 is used in the next execution of the routine.

As described above, the interface unit 50 includes the first switch unit 53 located with the first filter 51 and the second filter 52 on one side and the arithmetic processing unit 80 on the other side. The arithmetic processing unit 80 selects, as the selected filter, one filter out of the first filter 51 and the second filter 52 with use of the first switch unit 53, based on the length of the control pulse.

According to this configuration, circuits for A/D conversion are reduced in number compared to the electric motor control device 10 according to the first embodiment. Accordingly, in the electric motor control device 10 according to the second embodiment, power supplied to the electric motor can be controlled appropriately with a simpler configuration.

Third Embodiment

Figure 9:
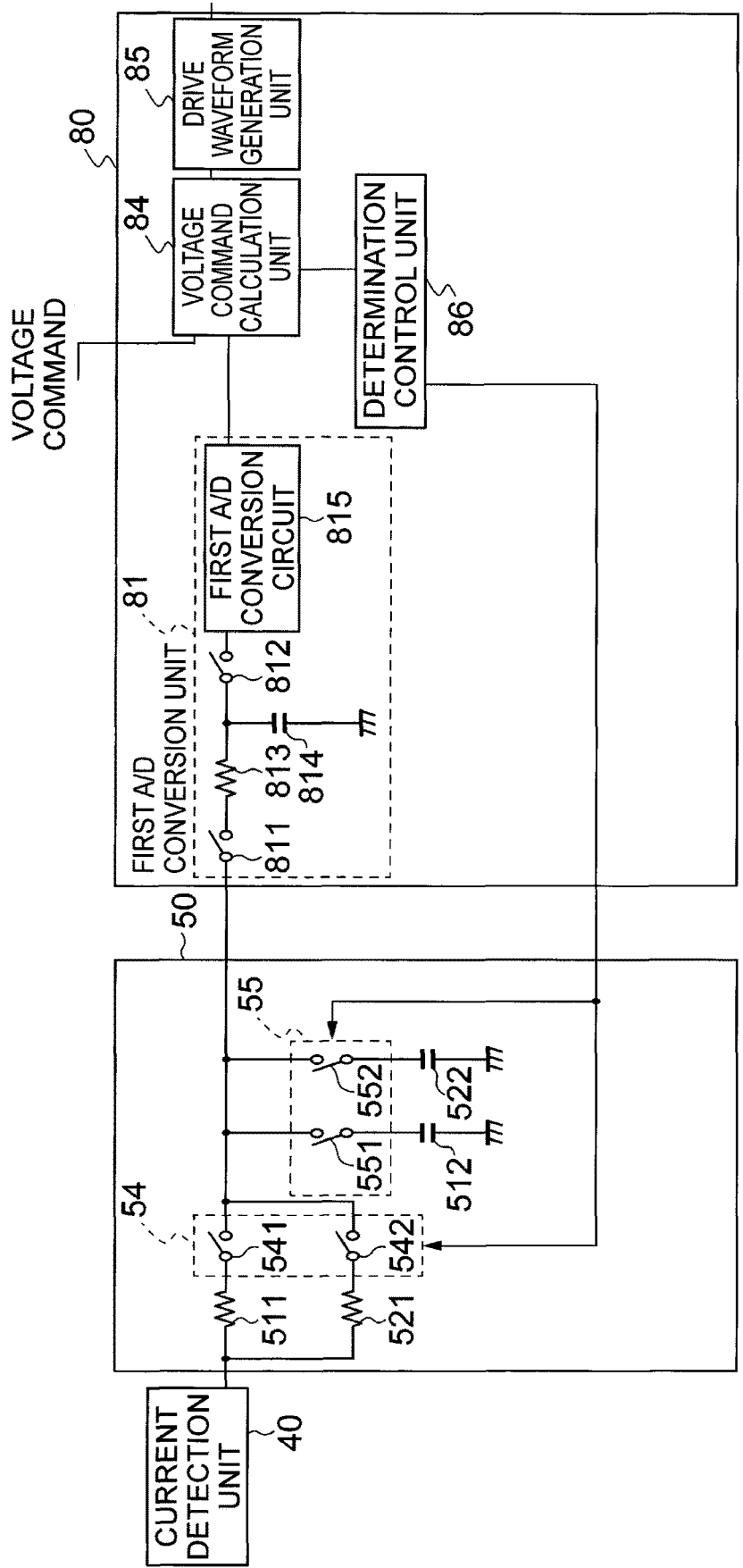
FIG. 9 is a diagram for illustrating configurations of an interface unit and an arithmetic processing unit in a third embodiment of this disclosure.

An electric motor control device according to a third embodiment of this disclosure is described next. FIG. 9 is a diagram for illustrating configurations of the interface unit 50 and the arithmetic processing unit 80 in the third embodiment. The interface unit 50 includes, as a plurality of filter resistors, the first resistor 511 and the second resistor 521. The interface unit 50 includes, as a plurality of filter capacitors, the first capacitor 512 and the second capacitor 522. The interface unit 50 also includes a second switch unit 54 and a third switch unit 55.

Other than the points described above, the electric motor control device 10 according to the third embodiment has the same configuration as the configuration of the electric motor control device 10 of FIG. 6. Description on the same components as those of the electric motor control device 10 of FIG. 6 is omitted below.

The second switch unit 54 includes a third switch 541 and a fourth switch 542. The third switch unit 55 includes a fifth switch 551 and a sixth switch 552.

One end of the first resistor 511 is connected to the current detection unit 40. The other end of the first resistor 511 is connected to the first A/D conversion unit 81 via the third switch 541. One end of the second resistor 521 is connected to the current detection unit 40. The other end of the second resistor 521 is connected to the first A/D conversion unit 81 via the fourth switch 542.

One end of the first capacitor 512 is connected to the ground GND. The other end of the first capacitor 512 is connected to the first A/D conversion unit 81 via the fifth switch 551. One end of the second capacitor 522 is connected to the ground GND. The other end of the second capacitor 522 is connected to the first A/D conversion unit 81 via the sixth switch 552.

The second switch unit 54 selects at least one filter resistor out of the first resistor 511 and the second resistor 521, and connects the at least one selected filter resistor to the first A/D conversion unit 81. The third switch unit 55 selects at least one filter capacitor out of the first capacitor 512 and the second capacitor 522, and connects the at least one selected filter capacitor to the first A/D conversion unit 81.

The arithmetic processing unit 80 determines which filter is to be selected, by selecting a filter resistor and a filter capacitor with use of the second switch unit 54 and the third switch unit 55, based on the length of a PWM control pulse. The filter resistor is at least one resistor out of the first resistor 511 and the second resistor 521. The filter capacitor is at least one capacitor out of the first capacitor 512 and the second capacitor 522.

FIG. 10 is a table for showing an example of combinations of states into which the third switch 541 to the sixth switch 552 are brought by control exerted by the arithmetic processing unit 80 of FIG. 9. In FIG. 10, a time $t_{s1}$ is a time at which an increasing voltage of the reference triangular wave reaches "$(V_{rb}+V_{rt})/4$." The time $t_{s2}$ is a time at which the increasing voltage of the reference triangular wave reaches "$(V_{rb}+V_{rt})/2$," and is later than the time $t_{s1}$. A time $t_{s3}$ is a time at which the increasing voltage of the reference triangular wave reaches "$3\times(V_{rb}+V_{rt})/4$," and is later than the time $t_{s2}$.

When the duty ratio D is 25% or lower, the rise start time $t_s$ is the time $t_{s3}$ or later. In this case, the determination control unit 86 sets the third switch 541, the fourth switch 542, the fifth switch 551, and the sixth switch 552 to ON, OFF, ON, and ON, respectively. Consequently, a combined resistance $R_s$ is $R_1$, and a combined capacitance $C_s$ is "$C_1+C_2$." A filter of this settings is hereinafter referred to as "third filter." A time constant $\tau_3$ of the third filter is "$(C_1+C_2)\times R_1$."

When the duty ratio D is within a range higher than 25% and equal to or lower than 50%, the rise start time $t_s$ is within a range that is the time $t_{s2}$ or later and precedes the time $t_{s3}$. In this case, the determination control unit 86 sets the third switch 541, the fourth switch 542, the fifth switch 551, and the sixth switch 552 to ON, OFF, ON, and OFF, respectively. Consequently, the combined resistance $R_s$ is $R_1$, and the combined capacitance $C_s$ is $C_1$. A filter of this settings is hereinafter referred to as "fourth filter." A time constant $\tau_4$ of the fourth filter is "$C_1\times R_2$."

When the duty ratio D is within a range higher than 50% and equal to or lower than 75%, the rise start time $t_s$ is within a range that is the time $t_{s1}$ or later and precedes the time $t_{s2}$. In this case, the determination control unit 86 sets the third switch 541, the fourth switch 542, the fifth switch 551, and the sixth switch 552 to OFF, ON, OFF, and ON, respectively. Consequently, the combined resistance $R_s$ is $R_2$, and the combined capacitance $C_s$ is $C_2$. A filter of this settings is hereinafter referred to as "fifth filter." A time constant $\tau_s$ of the fifth filter is $C_2\times R_2$."

When the duty ratio D is higher than 75%, the rise start time $t_s$ is within a range that precedes the time $t_{s1}$. In this case, the determination control unit 86 sets the third switch 541, the fourth switch 542, the fifth switch 551, and the sixth switch 552 to ON, ON, OFF, and ON, respectively. Consequently, the combined resistance $R_s$ is "$(R_1\times R_2)/(R_1+R_2)$," and the combined capacitance $C_s$ is $C_2$. A filter of this settings is hereinafter referred to as "sixth filter." A time constant $\tau_6$ of the sixth filter is "$C_2\times[(R_1\times R_2)/(R_1+R_2)]$."

Accordingly, of the time constants of the third filter, the fourth filter, the fifth filter, and the sixth filter, the time constant $\tau_3$ of the third filter is the largest, and the time constant $\tau_6$ of the sixth filter is the smallest. The time constant $\tau_4$ of the fourth filter is the second largest, and the time constant $\tau_s$ of the fifth filter is the third largest.

In this manner, the duty ratio D is divided into four, and a time constant of the selected filter is set so as to be smaller when the duty ratio D is higher. Four selected filters are implemented by changing combinations of two resistors and two capacitors. Accordingly, compared to a case in which four filters are simply selected, resistors and capacitors are reduced in number. The electric motor control device 10 capable of obtaining a detected current value with even higher precision than in the first embodiment and the second embodiment is thus implemented with a simple configuration.

Figure 11:
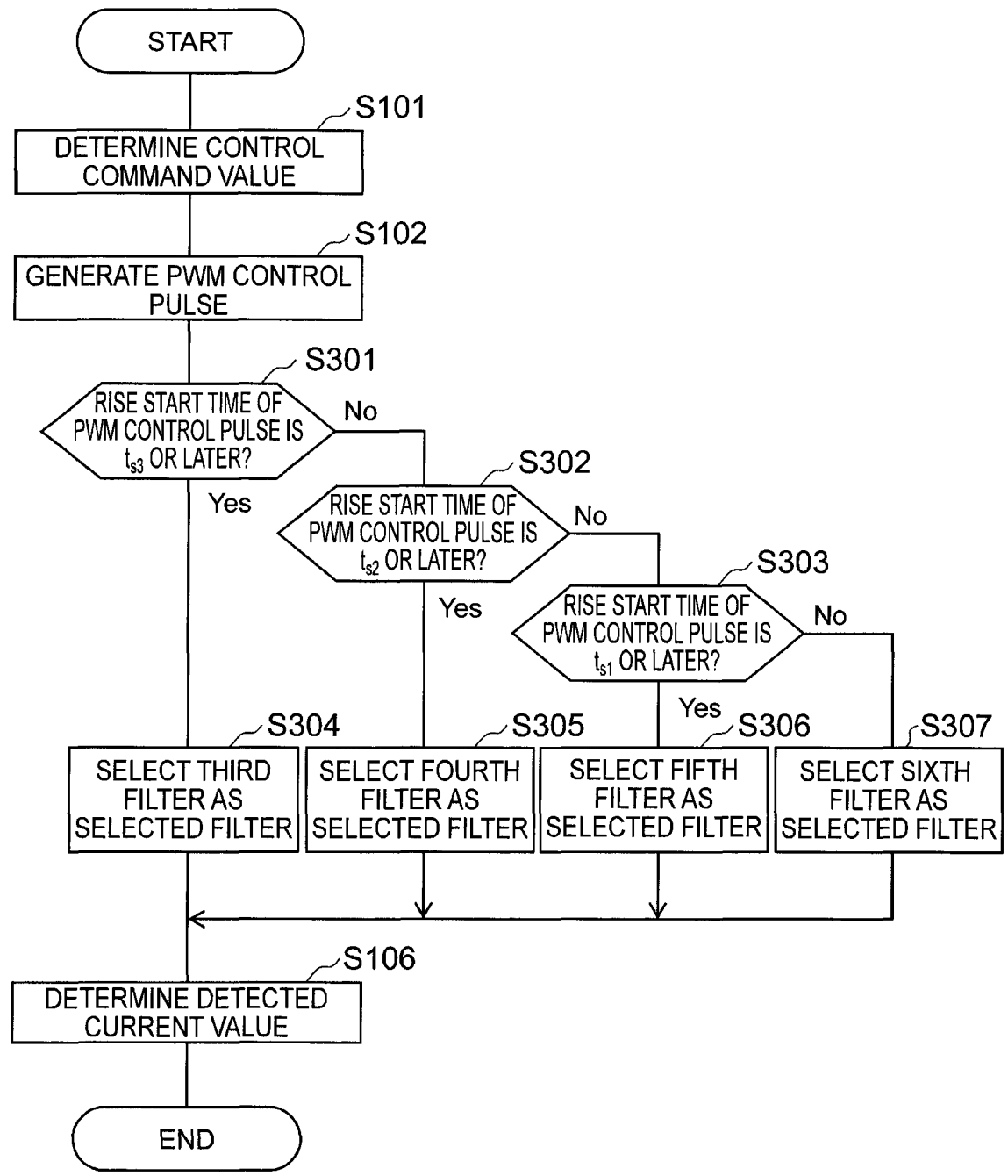
FIG. 11 is a flow chart for illustrating an electric motor control routine executed by the arithmetic processing unit of FIG. 9.

FIG. 11 is a flow chart for illustrating an electric motor control routine executed by the arithmetic processing unit 80 of FIG. 9. The routine of FIG. 11 is designed so as to be executed, for example, each time a control command arrives. When the routine of FIG. 11 is started, the arithmetic processing unit 80 determines, in Step S101, a control command value of a control command directed to the electric motor 20.

Next, in Step S102, the drive waveform generation unit 85 generates the PWM control pulse by comparing the determined applied voltage to the reference triangular wave.

Next, in Step S301, the determination control unit 86 determines whether the rise start time $t_s$ of the generated PWM control pulse is the time $t_{s3}$ or later.

When the rise start time $t_s$ of the PWM control pulse is the time $t_{s3}$ or later, the determination control unit 86 selects the third filter as the selected filter in Step S304.

When the rise start time $t_s$ of the PWM control pulse precedes the time $t_{s3}$, on the other hand, the determination control unit 86 determines, in Step S302, whether the rise start time $t_s$ of the PWM control pulse is the time $t_{s2}$ or later.

When the rise start time $t_s$ of the PWM control pulse is the time $t_{s2}$ or later, the determination control unit 86 selects the fourth filter as the selected filter in Step S305.

When the rise start time $t_s$ of the PWM control pulse precedes the time $t_{s2}$, on the other hand, the determination control unit 86 determines, in Step S303, whether the rise start time $t_s$ of the PWM control pulse is the time $t_{s1}$ or later. The time $t_{s1}$ is a time that precedes the time $t_{s2}$.

When the rise start time $t_s$ of the PWM control pulse is the time $t_{s1}$ or later, the determination control unit 86 selects the fifth filter as the selected filter in Step S306.

When the rise start time $t_s$ of the PWM control pulse precedes the time $t_{s1}$, on the other hand, the determination control unit 86 selects the sixth filter as the selected filter in Step S307.

Next, in Step S106, the determination control unit 86 determines the obtained A/D value as the detected current value, and ends this routine for now. The detected current value determined in Step S106 is used in the next execution of the routine.

As described above, the interface unit 50 includes the first resistor 511, the second resistor 521, the first capacitor 512, the second capacitor 522, the second switch unit 54, and the third switch unit 55.

The second switch unit 54 selects at least one filter resistor out of the first resistor 511 and the second resistor 521, and connects the at least one selected filter resistor to the arithmetic processing unit 80. The third switch unit 55 selects at least one filter capacitor out of the first capacitor 512 and the second capacitor 522, and connects the at least one selected filter capacitor to the arithmetic processing unit 80.

The arithmetic processing unit 80 selects at least one filter resistor out of the first resistor 511 and the second resistor 521 with use of the second switch unit 54, based on the length of the PWM control pulse. The arithmetic processing unit 80 selects at least one filter capacitor out of the first capacitor 512 and the second capacitor 522 with use of the third switch unit 55, based on the length of the PWM control pulse. In this manner, the arithmetic processing unit 80 determines which filter is to be selected.

A selected filter more appropriate in timing can thus be selected from among four selected filters having time constants different from one another, based on the length of the PWM control pulse. An even more precise detected current value can accordingly be obtained with a simple configuration.

The number of selected filters is 2 in the first embodiment and the second embodiment, and is 4 in the third embodiment. However, the number of selected filters is not particularly limited to 2 or 4, and can be any number that is an integer equal to or larger than 2.

The detected current value is used by the voltage command calculation unit 84 to calculate a voltage command, but may be used to detect a failure in the electric motor 20, the switching unit 60, and the drive unit 70.

The electric motor 20 may be applied to vehicles other than automobiles, for example, motorbikes, farm vehicles, construction vehicles, and ships with motors.

A rotary electric machine may be used as a load instead of the electric motor 20. That is, targets of control by the electric motor control device 10 include the electric motor 20 and rotary electric machines.

As the current detection unit 40, a current sensor of a type that detects a magnetic field generated by a flowing current, or a current sensor of a type that converts a magnetic field generated by a flowing current into a voltage with use of a Hall effect, may be used.

For the first switching element 61, the second switching element 62, the third switching element 63, and the fourth switching element 64, metal oxide semiconductor field effect transistors (MOSFETs) or transistors may be used.

Figure 12:
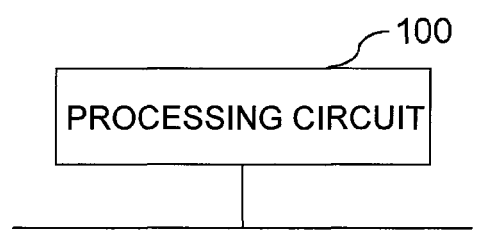
FIG. 12 is a configuration diagram for illustrating a first example of a processing circuit that implements functions of the electric motor control devices according to the first embodiment to the third embodiment.

Functions of the electric motor control device 10 according to the first embodiment to the third embodiment are implemented by a processing circuit. FIG. 12 is a configuration diagram for illustrating a first example of the processing circuit that implements the functions of the electric motor control device 10 according to the first embodiment to the third embodiment. A processing circuit 100 of the first example is a dedicated piece of hardware.

The processing circuit 100 corresponds to, for example, a single circuit, a complex circuit, a programmed processor, a processor for a parallel program, an application specific integrated circuit (ASIC), a field programmable gate array (FPGA), or a combination thereof.

Figure 13:
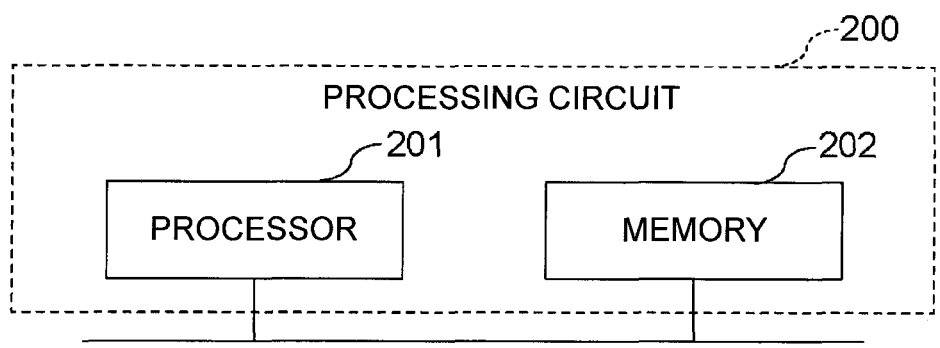
FIG. 13 is a configuration diagram for illustrating a second example of the processing circuit that implements the functions of the electric motor control devices according to the first embodiment to the third embodiment.

FIG. 13 is a configuration diagram for illustrating a second example of the processing circuit that implements the functions of the electric motor control device 10 according to the first embodiment to the third embodiment. A processing circuit 200 of the second example includes a processor 201 and a memory 202.

In the processing circuit 200, the functions of the electric motor control device 10 are implemented by software, firmware, or a combination of software and firmware. The software and the firmware are described as programs to be stored in the memory 202. The processor 201 reads out and executes the programs stored in the memory 202, to thereby implement the respective functions.

The programs stored in the memory 202 can also be regarded as programs for causing a computer to execute the procedure or method of each of the above-mentioned units. In this case, the memory 202 corresponds to, for example, a nonvolatile or volatile semiconductor memory, such as a random access memory (RAM), a read only memory (ROM), a flash memory, an erasable programmable read only memory (EPROM), or an electronically erasable and programmable read only memory (EEPROM). A magnetic disk, a flexible disk, an optical disc, a compact disc, a mini disc, or a DVD, for example, also corresponds to the memory 202.

The function of the electric motor control device 10 described above may be implemented partially by dedicated hardware, and partially by software or firmware.

In this way, the processing circuit can implement the functions of the electric motor control device 10 described above by hardware, software, firmware, or a combination thereof.

What is claimed is:

1. An electric motor control device, comprising:
switching circuitry including a switching element and configured to control power supplied to an electric motor;
current detection circuitry to output a detection signal corresponding to a current that flows in the electric motor;
interface circuitry to perform filtering processing on the detection signal; and
arithmetic processing circuitry to generate a control pulse for controlling the switching element,
the interface circuitry including a plurality of filters having time constants different from one another,
the arithmetic processing circuitry being configured to use, as a selected filter, a filter selected from among the plurality of filters based on a length of the control pulse, and use, as a detected current value, a value obtained by A/D conversion of a processed signal that is the detection signal on which the filtering processing has been performed with the selected filter.

2. The electric motor control device according to claim 1, wherein the arithmetic processing circuitry includes a plurality of A/D converters, and
wherein the plurality of filters and the plurality of A/D converters correspond to each other on a one-to-one basis.

3. The electric motor control device according to claim 1, wherein the interface circuitry includes first switch circuitry between the plurality of filters and the arithmetic processing circuitry, and
wherein the arithmetic processing circuitry is configured to select, as the selected filter, one filter out of the plurality of filters with use of the first switch circuitry, based on the length of the control pulse.

4. The electric motor control device according to claim 1, wherein the interface circuitry includes a plurality of filter resistors, a plurality of filter capacitors, second switch circuitry, and third switch circuitry,
wherein the second switch circuitry is configured to select at least one filter resistor out of the plurality of filter resistors, and connect the at least one selected filter resistor to the arithmetic processing circuitry,
wherein the third switch circuitry is configured to select at least one filter capacitor out of the plurality of filter capacitors, and connect the at least one selected filter capacitor to the arithmetic processing circuitry, and
wherein the arithmetic processing circuitry is configured to determine which filter is to be the selected filter, by selecting the at least one filter resistor out of the plurality of filter resistors and the at least one filter capacitor out of the plurality of filter capacitors, with use of the second switch circuitry and the third switch circuitry, based on the length of the control pulse.

5. The electric motor control device according to claim 1, wherein
the arithmetic processing circuitry generates the control pulse for controlling the switching element by comparing a voltage command value to a reference triangular wave, wherein the control pulse is a pulse width modulation (PWM) control pulse.

6. An electric motor control device, comprising:
switching circuitry including a switching element and configured to control power supplied to an electric motor;
current detection circuitry to output a detection signal corresponding to a current that flows in the electric motor;

interface circuitry to perform filtering processing on the detection signal; and arithmetic processing circuitry to generate a control pulse for controlling the switching element, the interface circuitry including a plurality of filters having time constants different from one another, the arithmetic processing circuitry being configured to use, as a selected filter, a filter selected from among the plurality of filters based on a length of the control pulse, and use, as a detected current value, a value obtained by A/D conversion of a processed signal that is the detection signal on which the filtering processing has been performed with the selected filter wherein the detected current value is an average value of current values detected during a period for which the control pulse keeps the switching element in an ON state.

7. The electric motor control device according to claim 6, wherein the arithmetic processing circuitry includes a plurality of A/D converters, and wherein the plurality of filters and the plurality of A/D converters correspond to each other on a one-to-one basis.

8. The electric motor control device according to claim 6, wherein the interface circuitry includes first switch circuitry between the plurality of filters and the arithmetic processing circuitry, and wherein the arithmetic processing circuitry is configured to select, as the selected filter, one filter out of the plurality of filters with use of the first switch circuitry, based on the length of the control pulse.

9. The electric motor control device according to claim 6, wherein the interface circuitry includes a plurality of filter resistors, a plurality of filter capacitors, second switch circuitry, and third switch circuitry, wherein the second switch circuitry is configured to select at least one filter resistor out of the plurality of filter resistors, and connect the at least one selected filter resistor to the arithmetic processing circuitry, wherein the third switch circuitry is configured to select at least one filter capacitor out of the plurality of filter capacitors, and connect the at least one selected filter capacitor to the arithmetic processing circuitry, and wherein the arithmetic processing circuitry is configured to determine which filter is to be the selected filter, by selecting the at least one filter resistor out of the plurality of filter resistors and the at least one filter capacitor out of the plurality of filter capacitors, with use of the second switch circuitry and the third switch circuitry, based on the length of the control pulse.

* * * * *